April 28, 1964  E. E. GIBBS ETAL  3,131,321
LIQUID-COOLED ROTOR FOR A DYNAMOELECTRIC MACHINE
Filed April 23, 1962  4 Sheets-Sheet 2
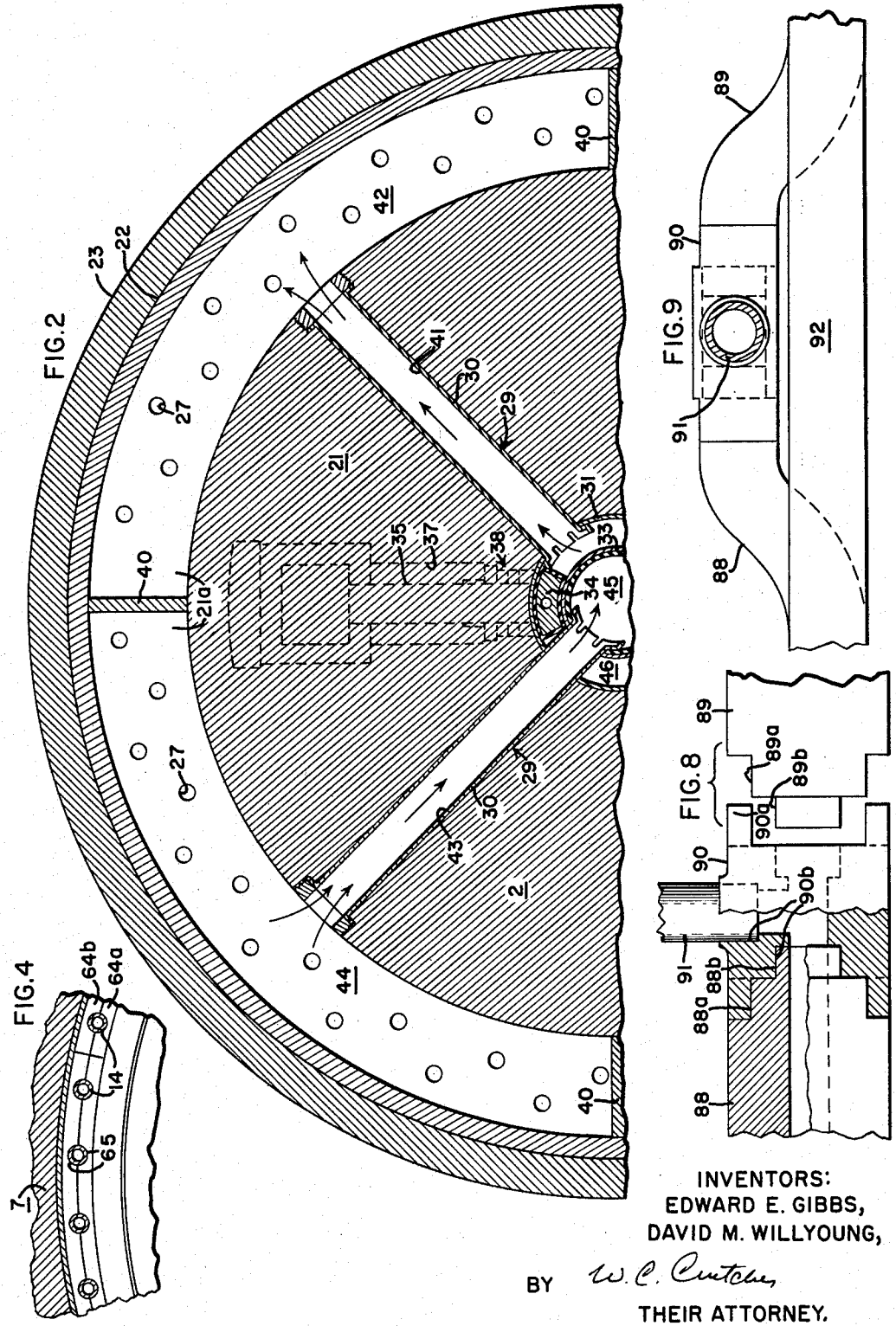
INVENTORS:
EDWARD E. GIBBS,
DAVID M. WILLYOUNG,
BY W. C. Crutcher
THEIR ATTORNEY.

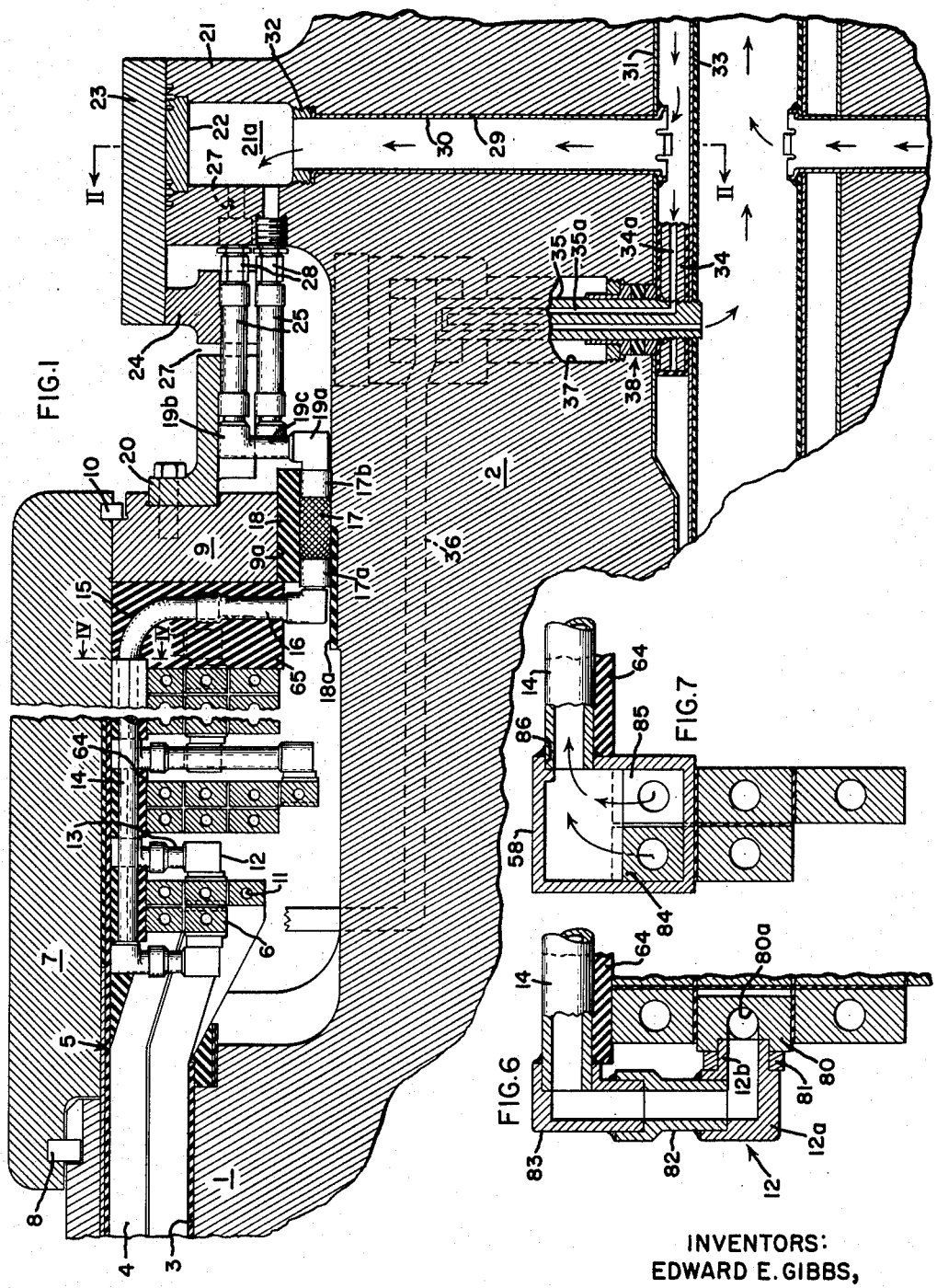

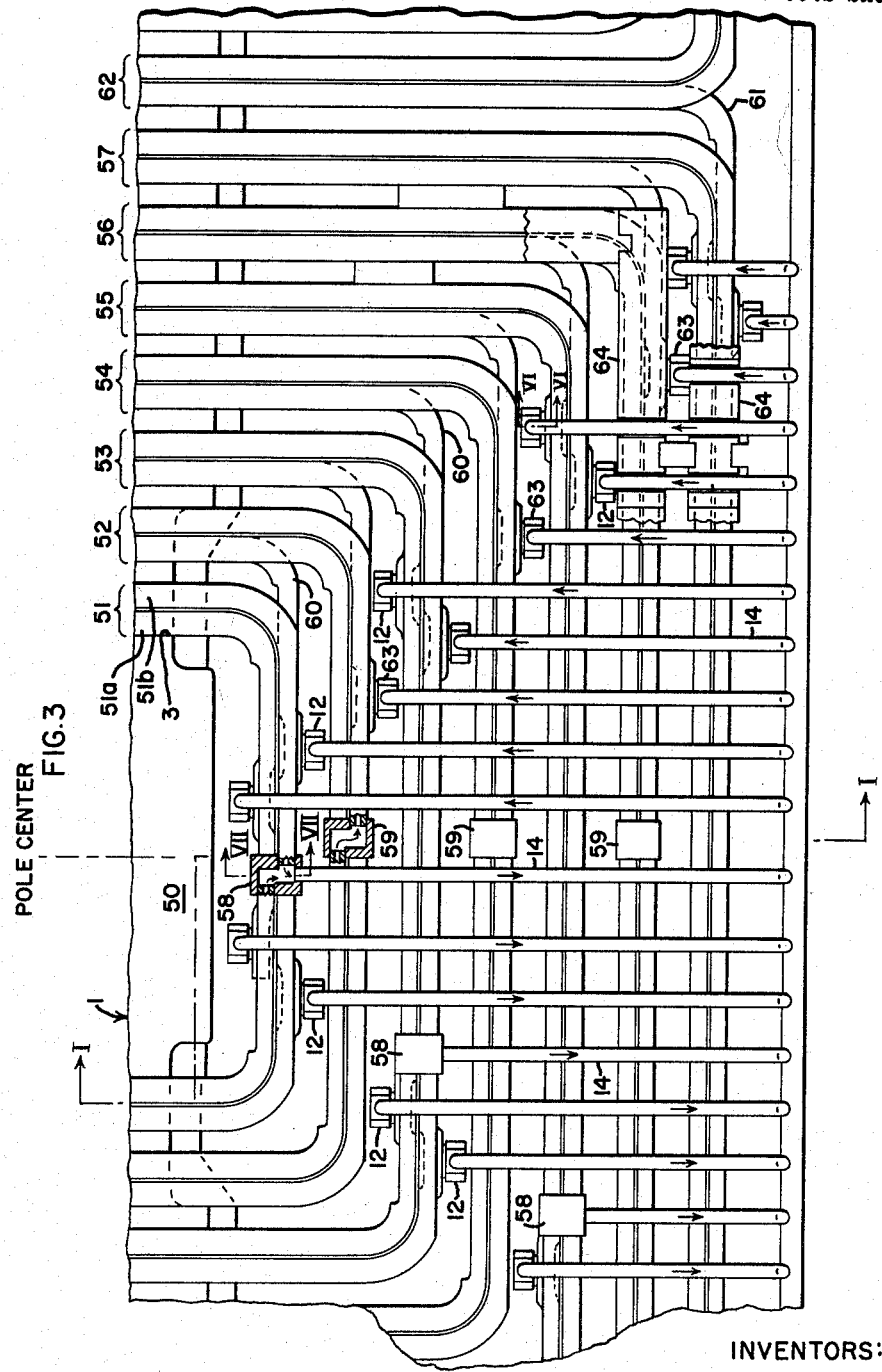

April 28, 1964 E. E. GIBBS ETAL 3,131,321
LIQUID-COOLED ROTOR FOR A DYNAMOELECTRIC MACHINE
Filed April 23, 1962 4 Sheets-Sheet 4
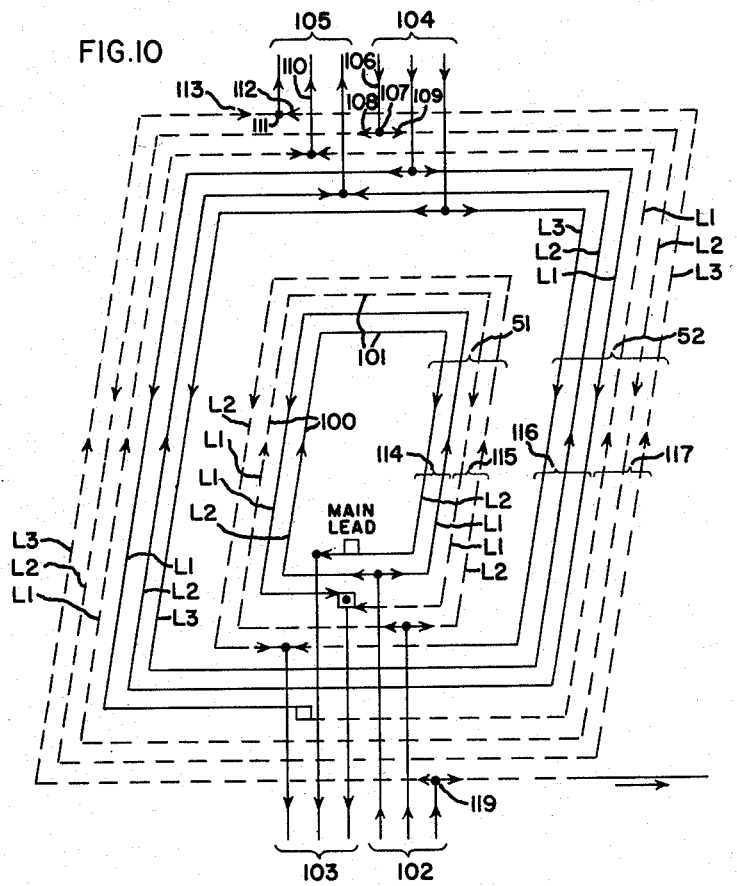
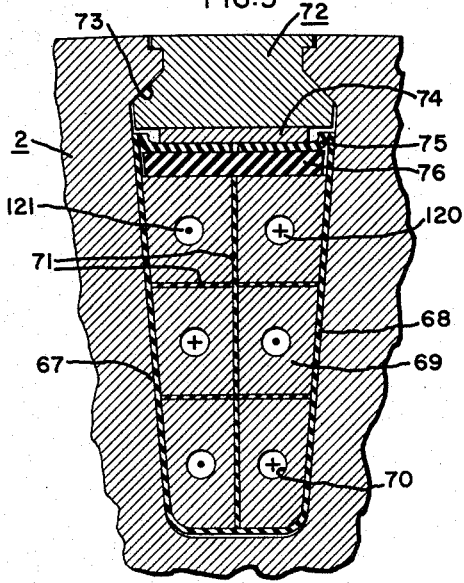
INVENTORS:
EDWARD E. GIBBS,
DAVID M. WILLYOUNG,
BY W. C. Crutcher
THEIR ATTORNEY.

United States Patent Office 3,131,321
Patented Apr. 28, 1964

3,131,321
LIQUID-COOLED ROTOR FOR A DYNAMO-
ELECTRIC MACHINE
Edward E. Gibbs, Schenectady, and David M. Willyoung, Scotia, N.Y., assignors to General Electric Company, a corporation of New York
Filed Apr. 23, 1962, Ser. No. 189,518
9 Claims. (Cl. 310—54)

This invention relates to an improved liquid-cooling arrangement for the rotor of a dynamoelectric machine wherein the windings are cooled internally by liquid piped directly into contact with the winding conductors.

In very large dynamoelectric machine rotors, such as the rotors of large turbine-generators, the current densities in the windings are so high as to make internal cooling of the conductors a necessity. In most such machines, rotor cooling has been accomplished by hydrogen gas. It has been realized that liquid might be profitably employed because of its greater capability as a heat transfer medium, but there are many problems attendant to its use, some of which are as follows:

The pressure in a radial liquid column increases as the square of its distance from the rotor axis. Near the periphery of a 40-inch diameter water-cooled rotor turning at 3600 r.p.m., liquid pressures in excess of 2600 p.s.i. may be expected. Therefore, all liquid connections must have maximum reliability in order to prevent leaks. In the event that a leak develops during construction or in service, it is desirable that the liquid connections be readily accessible for repair, without having to completely remove the windings from the rotor.

In order to remove the need for flooding the entire rotor enclosure with liquid, with the concurrent possibility of leakage along the rotor slots, it has been suggested that the windings be separately piped. In other words, the conductors themselves are hollow and leak-tight with the liquid carried inside. However, in order to prevent too long a hydraulic flow passage, with consequent excessive pressure drops, it is desirable to introduce the liquid at a number of places in each coil of the winding through insulating hoses or pipes. One such arrangement for supplying each winding coil at a number of places from liquid manifolds beneath the end turn coils is disclosed in U.S. Patent 3,075,104 issued to David M. Willyoung and Peter A. Becker on January 22, 1963 and assigned to the assignee of the present application. Although this arrangement provided for excellent security of the manifold-to-conductor liquid connections, with added flexibility for cooling a half-turn, a full turn, a turn and a half, or several turns in series from a single liquid connection, the manifolds and liquid connections were relatively inaccessible and difficult to assemble and service. In addition, the aspect ratio of the conductors (that is, the ratio of their average width to height) was large, unless very few conductors were used in the coil, since the conventional method of stacking a single column of conductors radially in the slot was necessary. Ideally, the width and thickness of liquid-cooled conductors should be substantially the same in order to reduce the conductor stresses from internal liquid pressure to a minimum, and provide sufficient wall thickness for substantial connections at the point of inlet or egress of liquid.

Also as pointed out in the aforementioned U.S. Patent 3,075,104, ideal cooling requirements are not compatible with ideal electrical requirements, the former favoring only a few turns in order to reduce the number of hydraulic connections and the latter favoring a greater number of turns in order to meet standard voltages of presently available exciters. The present arrangement offers an ideal compromise by providing a "two pass" cooling flow, i.e., with coolant flowing down and back along the rotor through a full turn. Yet inlet and outlet connections are located on both ends of the rotor in order to use as many hydraulic connections as possible in the available space.

Another problem attached to liquid cooling individually-piped conductors carrying D.-C. current is that the liquid may be slightly conductive. Since there is a potential difference between the individual liquid connection points to the winding and ground, the liquid constitutes a leakage path through which a small current can flow. This can cause electrolytic corrosion. Therefore, it is desired to have liquid paths between the winding and ground of sufficient length to reduce leakage currents to an insignificant level.

Lastly, since metal pipes are also conductors, insulating hoses or pipes must be employed at some location in the liquid circuit. It is difficult, if not impossible, to construct such hoses to provide a burst strength as high as that of metal pipes. Accordingly, it is desirable that all such insulating hoses be located as close to the rotor axis as possible in order to reduce the pressures, and to provide means for adequately supporting the hoses against hydraulic pressure and centrifugal force.

Accordingly, one object of the present invention is to provide an improved liquid cooling arrangement for a dynamoelectric machine rotor having improved reliability and accessibility to the liquid connections.

Another object of the invention is to provide an improved structure for distributing liquid coolant to the windings of a dynamoelectric machine rotor.

Still another object of the invention is to provide an improved arrangement of the conductors in the slots and end turns which will facilitate supplying liquid to internal passages in the conductors.

Another object of the invention is to provide an end turn arrangement including liquid fittings, which does not substantially increase the diameter of the rotor.

Yet another object of the invention is to provide an improved structure for introducing liquid to the individual conductors in the end turn stacks.

Another object of the invention is to provide an improved liquid supply manifold for distributing liquid to individually-piped conductors from the rotor bore-hole.

Further objects and advantages of the invention will become apparent from the description that follows, taken in connection with the accompanying drawing in which:

FIG. 1 is a horizontal elevation, partly in section, of the end turns and liquid manifold of a liquid-cooled generator rotor;

FIG. 2 is an end view in section of the liquid manifold taken along lines II—II of FIG. 1;

FIG. 3 is a developed plan view of the end turns and supply pipes for one pole of the rotor of FIG. 1;

FIG. 4 is an axial view taken through the liquid supply pipes along lines IV—IV of FIG. 1;

FIG. 5 is an axial view, in cross section, through a typical winding slot;

FIG. 6 is an enlarged view, in section, of a typical end turn liquid fitting for a conductor in the center of an end turn stack;

FIG. 7 is an enlarged view, in section, of a liquid fitting for the top two conductors of a coil, the view being taken along lines VII—VII of FIG. 3;

FIGS. 8 and 9 are enlarged elevation and plan views respectively of an alternate type of liquid fitting; and FIG. 10 is a schematic drawing showing the liquid coolant distribution and flow diagram for the two innermost coils of the rotor.

Briefly stated, the invention is practiced by employing hollow conductors, preferably with dual coils, in each pair of slots. Liquid fittings feeding the conductor passages are disposed between each stack of end turns. The fittings are supplied from pipes extending up and over the depressed end turn stacks for accessibility. These pipes are individually supplied, in turn, through insulating conduits disposed close to the rotor spindle to reduce pressure. Annular liquid supply and discharge manifolds are zoned into supply and discharge arcs with flow to and from the rotor bore-hole. Odd coils are serviced from manifolds disposed on one end of the rotor, while even coils are serviced from manifolds on the other end of the rotor. Thus, space on either side of any given double stack of end turns is provided for the liquid fittings.

Referring now to FIG. 1 of the drawing, the generator rotor comprises a central body portion having a number of circumferentially spaced, axially extending slots disposed about its periphery on either side of the rotor poles, and at either end of the central body portion is a rotor spindle or shaft portion. FIG. 1 shows the junction of the central body portion 1 with the smaller diameter spindle portion 2. The view is taken through a slot 3 containing the innermost winding coil for rotor body 1. The axially-extending conductors 4, which are depressed radially inward as they leave the slot as indicated by arrow 5, are bent into circumferentially extending conductors 6 in the end turn region. As will be explained more fully, the axially-extending conductors 4 of the slots and the circumferentially-extending conductor 6 of the end turns are preferably radially stacked in two columns rather than in the conventional single column of conductors. The end turns are held in place against centrifugal force by means of a massive retaining ring 7 secured to rotor body 1 by a shrink fit (not shown) and a bayonet-type key lock 8. At its outer end, retaining ring 7 is shrunk to a massive centering ring 9, which is additionally held against axial movement by a key 10. The inner edge 9a of centering ring 9 is radially spaced from the rotor spindle 2 to provide an annular opening.

The cross section through the circumferentially extending conductors 6 in the end turns reveals that the conductors there have a rectangular cross section with the greater dimension running in the radial direction and that central cooling passages 11 extend through the conductors. Passages 11 are serviced by liquid supply and discharge fittings 12 located between the double stacks of circumferentially extending end turns.

Fittings 12 are serviced by radially extending pipes 13 which, in turn, are connected to axially extending, circumferentially spaced pipes 14. It is to be observed that the axially extending pipes 14 lie radially outward of the circumferentially extending end turn conductors 6, which are depressed inwardly for this reason. Pipes 14 are bent radially inward at 15 to join radial pipe fittings 16. Each radial pipe 16 is connected to an insulating conduit 17, which serves to electrically insulate the metal cooling pipes and fittings 12–16 from ground potential. Insulating conduits 17 may comprise a reinforced rubber-and-braid hose-type construction secured by metal ferrules 17a, 17b at either end. These members will be referred to hereinafter as hoses to emphasize that they are of nonmetallic construction. In actual practice, they are so heavily reinforced as to make them almost rigid. Although the bursting strength of such an insulating hose can be made quite high, it nevertheless cannot withstand as high a bursting pressure as the metal members 12–16. For this reason, insulating hoses 17 are located at the radially innermost location possible in a ring around rotor spindle 2. They are held in place by a ring of insulation 18, which also insulates the inner ferrule 17a from the centering ring 9. Another ring of insulation 18a insulates the ferrules 17a from the spindle 2. Thus, the inner ferrules 17a are at the potential of the particular conductor serviced by that insulating hose 17, while the ferrules 17b are all at ground potential.

Connected to ferrules 17b of hoses 17 are elbows 19a, to which are brazed alternating long and short elbows 19b, 19c respectively. Elbows 19b, 19c are connected to relatively flexible metallic pipes 25 which are alternated in radially inner and outer positions to gain additional space. The left-hand portions of pipes 25 are held in place against centrifugal force by a ring 20 having a "stepped" inner surface to correspond to the alternating pipe positions.

In order to furnish a means to supply and to discharge liquid coolant to and from the conductors, the rotor spindle 2 includes a peripheral flange 21 which is furnished with an arcuate passage 21a, which is sealed and zoned to provide arcuate liquid manifolds. The top of passage 21a is sealed by welding on arcuate segments 22 which are further held in place by a ring 23 shrunk on after machining. The end of ring 23 extends axially to allow attachment of an inner ring 24 with a "stepped" inner surface. This serves to hold down the right-hand ends of pipes 25. A gap 27 between rings 20, 24 allows for flexible movement of the unsupported portion of pipes 25 to take place as the centering ring 9 moves relative to the rotor spindle 2. Pipes 25 are connected to threaded holes 27 in flange 21 by means of fittings 28.

In the preferred embodiment disclosed, passage 21a in the flange 21 is divided by spacers 40 into four arcuate chambers, two supply chambers and two discharge chambers (FIG. 2). Liquid is supplied from and discharged to the bore-hole through radial holes 29, which are supplied with stainless steel liners 30. These are sealed in place at the inner end by welding to similar liners 31 in the bore-hole and by the pressure of threaded fittings 32 at the outer end. The bore-hole is divided into inner and outer liquid discharge and supply passages respectively by means of a tube 33 coaxial with the rotor axis. Tube 33 may be a stainless steel tube lined on its inner surface with thermal barrier plastic such as polytetrafluoroethylene.

Current is supplied to the windings from the collector rings (not shown) by means of axially extending collector leads 34 disposed between tube 31 and tube 33, and electrically connected to a radial terminal stud 35, which is in turn connected to a main lead 36. Collector lead 34 and terminal stud 35 are cooled by means of internal passages 34a, 35a respectively, in a cooling circuit that discharges liquid to the interior of tube 33. Terminal stud 35 is disposed in a radial access hole 37 and sealed against leakage of liquid by means of a stacked ring sealing assembly 38.

FIG. 2 illustrates the arrangement of the liquid manifold, one of these manifolds being on each end of the rotor. Only the upper half of the rotor is shown, the lower half being similar. The circumferential groove 21a inside flange 21 is subdivided into four arcuate chambers by means of dividers 40. Radial inlet and outlet holes with steel liners are shown disposed 90 degrees apart. The other holes for the lower half of the rotor are diametrically opposite so as to keep the rotor in balance. An inlet tube 41 communicates with a 90-degree arcuate supply chamber 42 disposed on one side of the rotor pole, while an outlet tube 43 communicates with a similar discharge chamber 44 on the other side of the rotor pole. The other two arcuate chambers for the lower half are arranged so that chambers containing liquid of the same temperature oppose one another, to neutralize any thermal unbalance which might cause bowing of the rotor.

Pipe 33 in the bore-hole of rotor spindle 2 divides the bore-hole into a central discharge conduit 45 and a surrounding supply conduit 46. Liquid may be supplied to conduit 46 and received from conduit 45 by any suitable means, such as from one end of the shaft or by means of manifolds with suitable seals on the periphery of the shaft as described in the aforementioned application Serial No. 25,263.

Thus, liquid flows axially in chamber 46, through pipe 41 to chamber 42, and is supplied through the staggered, circumferentially spaced holes 27 to the cooling pipes, as explained previously. The liquid returns through similar holes 27 to arcuate chamber 44, then flows radially inward through tube 43, and is discharged axially in conduit 45 along the rotor axis. (It will be observed that the natural inclination of the liquid would be to flow in the opposite direction from that indicated, since conduit 46 is at a greater distance from the rotor axis than conduit 45.) However, the liquid is purposely caused to flow against the natural pressure head set up by the rotation of the rotor, so that the pump supplying the liquid works against a back pressure. This tends to discourage the formation of vapor in the liquid cooling circuit.

FIG. 3 of the drawing is a developed plan view of the end turns at one of the rotor poles, with the retaining ring removed. There it will be seen that a number of dual stack coils, designated 51 to 57, are circumscribed about the rotor pole 50. Each coil, such as the innermost coil 51, for example, comprises an inside stack of conductors 51a, and an outside stack 51b. Stacks 51a, 51b of the innermost coil 51 are disposed in a single slot 3 and insulated therefrom. The inside and outside stacks of each coil are electrically and hydraulically connected by means of special top-to-top fittings. (Some of these fittings, designated 58, are arranged to communicate with one of the axially extending liquid pipes 14, whereas other top-to-top fittings, designated 59, merely provide an electrical connection and a hydraulic connection between the inside and outside stacks. One of each of the fittings 58 and 59 is shown in cross section to illustrate the transition of liquid from one stack to the next.)

The dual stack coils 51, 52 . . . 57 are electrically and hydraulically connected by coil-to-coil connections 60, which preferably are provided by extending the radially innermost conductor of an outside coil stack to the inside stack of the next outer coil. From the outermost coil 57, a similar extension 61 makes the transition to the outermost coil 62 of the other rotor pole.

As explained previously, fittings 12 between the end turn stacks are individually serviced by one of the circumferentially-spaced, axially extending pipes 14, lying on top of (or radially outward of) the end turns. All of the fittings 12, including top-to-top fittings 58, on the right-hand side of rotor pole 50, are connected with pipes 14 fed from the arcuate supply chamber 42 (see FIG. 2), whereas all of the fittings on the left-hand side of pole 50 are serviced by pipes 14 connected to the discharge chamber 44 (see FIG. 2).

In order to gain additional space for the fittings between the stacks of end turns, similar fittings and liquid manifolds are used on both ends of the rotor. Generally speaking, odd-numbered coils are serviced by manifolds on one end of the rotor, while even-numbered coils are serviced by manifolds on the other end of the rotor. In FIG. 3, it will be observed that all of the fittings 12 and also the top-to-top fittings 58 are connected to odd-numbered coils 51, 53, 55, 57. However, a few fittings, designated 63, are connected to the radially innermost conductors of the even-numbered coils. Fittings 63 are used to supply conductors which form the coil-to-coil extensions 60, making the transition to the next coil.

Since the conductors of each coil are disposed in a double stack, and since alternate coils are supplied with fittings at opposite ends of the rotor, there is sufficient space for disposing the fittings on either side of the end turns between the coils, and entry from either side of the end turn group of a particular coil is obtainable due to the fact that the stacks are double.

Although most of the insulating and blocking members which would be employed are omitted from FIG. 3 to increase the clarity, one group of special blocking members used to circumferentially separate the pipes 14 and to insulate them from the end turns over which they pass may be seen at 64. FIG. 4, which is a view along lines IV—IV of FIG. 1, illustrates that the axially extending pipes 14 are located between retaining ring 7 and the top layer of conductors. Blocking 64 comprises inner and outer arcuate segments 64a, 64b respectively. Half-round grooves 65 along the mating surfaces of segments 64a, 64b receive pipes 14 and hold them in place, as well as insulating them from the conductors.

Although FIG. 1 appears to indicate that the conductors 4 are stacked only two high in slot 3, this is true of the innermost coil 51 only. A view through a typical slot section for coils other than the innermost coil may be seen by reference to FIG. 5. There it will be seen that rotor body 1 is preferably cut with tapered slots 67, each lined with a sheet of ground insulation 68, and containing two three-high radial stacks of conductors 69. Each conductor 69 has a central cooling passage 70 and is formed with a trapezoidal cross section in order to conform to the tapered slot 67. Conductors 69 are also separated by relatively light turn insulation 71.

The conductors 69 are held in the slot by means of a slot wedge 72 fitting in mating dovetail grooves 73 cut in the top of the slot. An amortisseur strip 74 is disposed beneath wedge 72; an additional strip of insulation 75 and a creepage block 76 complete the insulation of the conductors 69 at the top of the slot.

The simplest way to fabricate a hollow conductor is with a single central hole. However, it will be observed from FIG. 5 that, due to the natural shape of the slot in a generator rotor, which is rather deep in the radial direction and narrow in the transverse direction, a conventional stacking of conductors in a single radial column would require fairly large conductors if conductor metal were evenly distributed about the hole. On the other hand, if a great many conductors were used, there would be the danger of insufficient wall thickness around the cooling passages. The double stack shown provides a greatly improved utilization of the slot cross section for hollow conductors and causes the metal to be more or less distributed around the cooling passages 70 to provide uniform cooling and optimum wall thickness.

Although conductors 69 in the slot are formed with an irregular shape to conform to a tapered slot, the conductors in the end turn section are substantially rectangular in order to provide good stacking, together with ease of access to the conductor cooling passages. One method of constructing a typical fitting 12 may be seen by reference to FIG. 6, which is a cross section taken along lines VI—VI of FIG. 3. There it will be seen that fitting 12 comprises an elbow 12a connected to a conductor 80 which has been slightly offset from the remainder of the conductors in the stack in order to facilitate connection. Although many types of connections may be used, a pad 81 is shown brazed to the side of conductor 80, and the nipple 12b of elbow 12a is then brazed in a hole formed in pad 81 and in conductor 80, which communicates with the conductor passage 80a. A straight union 82 and an elbow 83 are brazed between pipe 14 and fitting 12.

FIG. 7 illustrates a typical top-to-top connection such as the one shown in cross section and taken along lines VII—VII in FIG. 3. The two top conductors of the inside stack and the outside stack of a single coil, shown as 84 and 85 respectively, join the fitting 58 from opposite directions. Fitting 58 is a hollow box of conducting metal and the conductors 84, 85 are brazed into suitable holes, so that fitting 58 forms an electrical connection as well as a hydraulic connection between inside and outside stacks. At the top of fitting 58, an opening 86 receives one of the axial pipes 14 which is attached, as by brazing. Alternatively, the axial pipe 14 can be connected directly to the top of one of the circumferential conductors 84, 85 near fitting 58 by means of an elbow such as 83 in FIG. 6.

It will be observed in both FIGS. 6 and 7 that a fitting supplies or receives two parallel streams of liquid. In other words, if a fitting happens to be a supply fitting, the liquid divides into two portions and flows in opposite directions in the turn conductors, whereas if a fitting happens to be a discharge fitting, two streams combine in the fitting and flow out to the manifold as a single stream.

FIGS. 8 and 9 illustrate a modified form of liquid connection which may be used instead of that shown in FIG. 6 or portions of which may be combined with the type of connection shown in FIG. 6.

FIG. 8 is a horizontal elevation of an intermediate conductor in the end turn stack, whereas FIG. 9 is a plan view. Instead of connecting an elbow into the side of the conductor, as in FIG. 6, the conductor is bent or "jogged" out of the stack so that a pipe can provide access to the conductor cooling passage from the top of the conductor instead of from the side thereof. In the preferred embodiment, the conductor is not a single length when it is bent out of the stack, but is a built-up section comprising two terminating ends 88, 89 of conductors from the stack joined by a short, straight section 90. Section 90 is cut with flanges 90a adapted to overlap mating notches 88a, 89a in conductors 88, 89. Section 90 is also supplied with communicating holes 90b for receiving nipples 88b, 89b machined on the ends of conductors 88, 89, and also for receiving the end of a radial pipe 91. The radial pipe 91 is connected to axial pipes 14 by an elbow (not shown) such as 83 of FIG. 6.

By examining the plan view FIG. 9, it will be observed that, by means of the short connecting section 90, the ends of conductors 88, 89 can be bent outward from the remaining conductors 92 in the stack so that radial pipe 91 can pass radially alongside the remaining conductors 92 without interference.

If desired, the short connecting section 90 can be combined with the fittings shown in FIG. 6. In other words, the section 90 would be substituted for the conductor 80 of FIG. 6 with entry of the elbow 12a into the side of the section 90 rather than into the top thereof. The advantage of this construction is that the section 90, elbow 12a, union 82, elbow 83 and pipe 14 can be preassembled and tested as a small subassembly before being joined to the ends 88b, 89b of the long mating conductors 88, 89.

Referring to the schematic drawing of FIG. 10, the manner in which liquid is supplied to and withdrawn from the windings may be more readily understood. The parallel straight lines 100 represent the slot-lying conductors, while the parallel lines 101 represent the circumferentially extending conductors (here shown straight for purposes of illustration). Only the two innermost coils 51, 52 are shown, since the flow diagram for the remaining outer coils is similar. The coil 51, as well as the other odd coils, is serviced by groups of inlet pipes 102 and outlet pipes 103, on one end of the rotor. The next coil 52, as well as the additional even coils, is serviced by similar groups of inlet pipes 104 and outlet pipes 105, on the other end of the rotor. Each of the inlet pipes, one of which is seen at 106 and which corresponds to the axial pipes 14 previously described, terminates in a fitting similar to the ones of FIGS. 6 to 9, here designated 107, and feeds liquid in both directions along the conductor as indicated by arrows 108, 109. Similarly, a typical outlet pipe designated 110 terminates in a fitting 111 and collects liquid from both directions, as designated by arrows 112, 113.

The inner coil 51 comprises an inside stack 114 shown in solid lines which is two conductors high, and an outside stack 115 shown in dotted lines. The next coil 52, as well as the remaining coils (not shown), comprises an inside stack 116 three conductors high, shown in solid lines again, and an outside stack 117, also three conductors high, and shown in dotted lines. In order to indicate the relative radial positions of the conductors represented by solid and dotted lines, the lines are lettered L1, L2, etc. signifying the layer occupied in the slot from top to bottom. Thus L1 on a dotted line represents the top slot conductor in an outside stack, while L3 on a solid line represents the bottom conductor of an inside stack, etc. It may be noted that in some cases two different layers from opposite slots are connected. This indicates that a radial layer transition takes place in the end turns. The physical appearance of this transition may be seen by reference to FIG. 1, where it appears that a partial fourth layer of conductors is shown for the three-high stack of end turns, and a partial third layer of conductors is shown for the two-high stack of end turns.

By tracing the liquid flow on FIG. 10 from inlet fitting 107 starting with arrow 108, outlet fitting 111, it will be seen that the liquid travels one full turn through the conductor from inlet to outlet, making two "passes" through the rotor body length. One exception to this is the previously mentioned case of a fitting disposed on a coil-to-coil connecting conductor, one of which is shown in the schematic as 119. The liquid in one direction from fitting 119 travels only one-half of a turn to discharge from the fitting 111. This is done to transfer the fittings from one end of the rotor to the other and back again for alternate coils in the basically "two-pass" hydraulic system, in order to utilize the available space in which the piping connections can be made to the fullest.

It will also be observed from the schematic of FIG. 10 that the arrangement shown provides a distributed counterflow both in the slot-lying conductors and in the end-turn conductors. This is illustrated in the slot cross-section of FIG. 5, wherein the cross marks 120 represent flow into the paper and the dots 121 represent flow out of the paper.

The operation and advantages of the aforedescribed liquid-cooled rotor will be apparent from the following summation:

(a) The placement of fittings between stacks of end turn conductors and the location of liquid pipes on top of the end turn conductors provides improved accessibility for repair in the event of leakage.

(b) The use of dual stacks of conductors for each coil provides sufficient access for a multiplicity of fittings on either side of the end turns of one coil. Additional room for fittings and connecting pipes can be provided by utilizing fittings on both ends of the rotor for a "two-pass" arrangement.

(c) Top-to-top connections between inside and outside stacks of each coil, together with liquid connections running to the manifold, are all made at the accessible, radially outer layer of the end turns.

(d) The use of two stacks of conductors in the slot-lying portions provides uniform distribution of copper around a central cooling hole, giving improved space utilization of the relatively narrow slot, without the conductors becoming too large.

(e) The use of a fitting which supplies and receives liquid in parallel flows from both directions along the conductor reduces the number of fittings required.

(f) The flow distribution pattern shown in the schematic of FIG. 10 provides improved cooling through distributed counterflow in the slot portions and end turn portions of the winding.

(g) Depressing the end turns toward the rotor axis reduces the required amount of copper in the end turns, and reduces retaining ring stresses which would arise from the weight and radius of the copper alone. Depressing the end turns also allows room for the axially extending pipes on top of the end turns without increasing the rotor diameter.

(h) The use of brazed pipe fittings, either for top entry into fully offset conductors or for side entry, provides for joints which are adjustable during assembly, yet which give leak-free service under the high pressures imposed.

(i) The location of the lower strength insulating conduits beneath the centering ring provides support and places them at a radially innermost location on the rotor to reduce the liquid pressures and centrifugal forces on the hoses.

(j) The length of the liquid columns, i.e., the length of the liquid paths from ferrule to ferrule through the insulating hoses, can be extended sufficiently to reduce the D.-C. leakage current through the liquid to a point where electrolytic corrosion of the fittings does not occur.

(k) The supplying of liquid through the bore-hole from an outer diameter passage to an inner diameter passage, i.e., against the natural tendency of the liquid to flow to an outer passage due to the rotation of the rotor, reduces the possibility of vapor pockets in the cooling circuit.

(l) The use of arcuate supply and discharge manifolds fed from radial pipes leading to the bore-hole conduits and located outside of the retaining ring allows cleaning and inspection of the manifold without disturbing the windings.

Thus, it can be seen that the construction of the preferred embodiment described provides an improved liquid-cooled rotor arrangement for a piped winding. While there has been described herein what is at present considered to be the preferred embodiment of the invention, it will be apparent to those skilled in the art that various modifications may be made therein, and it is intended to cover in the appended claims all such modifications as fall within the true spirit and scope of the invention.

What we claim as new and desire to secure by Letters Patent of the United States is:

1. A liquid-cooled rotor for a dynamoelectric machine comprising:
   a rotor body defining a plurality of circumferentially spaced, axially extending slots,
   a plurality of winding coils having slot-lying portions disposed in said slots and having end turn portions extending axially and circumferentially outside of said slots, each of said coils comprising one or more stacks of radially disposed, insulated conductors, at least some of said conductors defining internal liquid passages,
   a source of liquid coolant,
   a plurality of pipe fittings disposed between said stacks of circumferentially extending end turn conductors and connected to said liquid passages of selected conductors,
   and a plurality of conduits, including insulating hose portions, connected to supply liquid coolant from said source to said fittings to cool the conductors, other portions of said conduits including pipes disposed radially outward of the end turn conductor stacks and extending radially inward between conductor stacks to connect with said fittings.

2. A liquid-cooled rotor for a dynamoelectric machine comprising:
   a rotor body defining a plurality of circumferentially spaced, axially extending slots,
   a plurality of coils having slot-lying portions disposed in said slots and having end turn portions extending axially and circumferentially outside of said slots, each of said coils comprising one or more stacks of radially disposed conductors, at least some of said conductors defining internal liquid passages,
   a source of liquid coolant,
   a plurality of pipe fittings disposed between stacks of circumferentially extending end turn conductors and connected to said liquid passages of selected conductors,
   a plurality of pipes having circumferentially spaced, axially extending portions lying radially outward of and insulated from the circumferentially extending end turn conductors, each of said pipes also having a radial portion extending inwardly between stacks and connected to one of said fittings,
   and a plurality of conduits including insulating hose portions, each connected to supply liquid coolant from said source to at least one of said pipes to cool the conductors.

3. The combination according to claim 2, wherein the end turn portions of said coils are depressed radially toward the rotor axis to reduce centrifugal forces on said end turn portions, and to provide space for said axially extending pipes.

4. The combination according to claim 2 wherein the selected conductors are transversely displaced in an axial direction from the end turn stacks, and wherein said fitting provides entry into said liquid passages from the top of the conductor.

5. A liquid-cooled rotor for a dynamoelectric machine comprising:
   a rotor body having spindle portions at either end thereof and defining a plurality of circumferentially spaced, axially extending slots,
   a plurality of coils having slot-lying portions disposed in said slots and having end turn portions extending both axially and circumferentially about the spindle portion at either end of said rotor body, each of said coils comprising circumscribed inside and outside adjacent stacks of radially-disposed insulated conductors, at least some of said conductors defining internal liquid passages,
   liquid supply and discharge manifolds disposed on the rotor spindle at either end of said rotor body,
   a plurality of fittings disposed between end turn stacks of adjacent coils, a majority of fittings on one end of the rotor being connected to said liquid cooling passages of selected conductors in odd coils and the majority of fittings on the other end of said rotor being connected to the liquid passages of selected conductors in even coils,
   and conduit means including first insulating portions and second portions disposed radially outward of the end turn conductors, said conduit means connecting said fittings to supply and discharge manifolds on either end of the rotor, whereby odd coils are serviced from one end of the rotor and even coils are serviced from the other end of the rotor, so as to provide space for fittings servicing either side of alternate coil end turns at either end of the rotor.

6. The combination according to claim 5, wherein said supply and discharge manifolds comprise a hollow flange member disposed on the rotor spindle, and divided into arcuate thermally and dynamically balanced quadrants.

7. The combination according to claim 5, wherein said conduit means comprises a plurality of insulated, axially extending, circumferentially spaced pipes disposed radially outward of the end turns, connected to a plurality of insulating hose means disposed closely adjacent the rotor spindle.

8. In a liquid-cooled dynamoelectric machine rotor, the combination of:
   a rotor body with a spindle portion on either end defining axial borehole passages, said rotor also having a liquid-cooled winding with internal passages disposed thereon, including end turn winding portions,
   a plurality of first liquid supply and discharge pipes having axially extending portions located radially outward of the end turn winding portions, said pipes being connected to said winding internal passages,
   a retaining ring disposed radially outward from the end turn portions and said first pipes to hold them in place,
   a centering ring attached to the outer end of said retaining ring and defining an inner bore radially spaced from said spindle portion,
   a plurality of insulating hoses disposed between the centering ring bore and the rotor spindle, and electrically insulated therefrom, each of said hoses being connected to a said first pipe,
   arcuate liquid supply and discharge manifolds defined by a subdivided hollow manifold ring disposed on said rotor spindle outside the retaining ring, a plurality of second pipes connecting the other ends of said insulating holes with said manifolds, whereby each of said manifolds services a group of first pipes and insulating hoses through said second pipes, third radial passages defined by the rotor spindle and connecting the manifolds with said spindle bore-hole passages, means supplying and discharging liquid coolant to and from the spindle bore-hole passages, whereby liquid may be supplied from the rotor bore-hole to the winding internal passages through insulating hoses disposed near the spindle portion and through pipes disposed radially outward of the winding end turns.

9. The combination according to claim 8, including first and second axially spaced support rings holding the respective ends of said second pipes in place and attached to said centering ring and to said hollow manifold ring respectively, the axial spacing between the first and second support rings allowing for movement of the second pipes due to deflection of the rotor spindle portions.

References Cited in the file of this patent

UNITED STATES PATENTS

| | | |
|---|---|---|
| 1,145,612 | Porter | July 6, 1915 |
| 1,448,700 | Seidner | May 13, 1923 |
| 2,898,484 | Krastchew | Aug. 4, 1959 |
| 3,034,003 | Seidner | May 8, 1962 |
| 3,092,741 | Horsley | June 4, 1963 |

FOREIGN PATENTS

| | | |
|---|---|---|
| 16,986 | Great Britain | of 1914 |
| 777,468 | Great Britain | June 26, 1957 |
| 1,071,217 | Germany | Dec. 17, 1959 |